(12) United States Patent
Chinazzo

(10) Patent No.: US 11,665,790 B2
(45) Date of Patent: May 30, 2023

(54) INDUCTION BURNER ELEMENT HAVING A PLURALITY OF SINGLE PIECE FRAMES

(71) Applicant: WHIRLPOOL CORPORATION, Benton Harbor, MI (US)

(72) Inventor: Fabiano Chinazzo, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/388,226

(22) Filed: Dec. 22, 2016

(65) Prior Publication Data
US 2018/0184489 A1    Jun. 28, 2018

(51) Int. Cl.
*H05B 6/12*    (2006.01)

(52) U.S. Cl.
CPC ......... *H05B 6/1209* (2013.01); *H05B 6/1254* (2013.01); *H05B 6/1272* (2013.01); *H05B 2206/022* (2013.01); *Y02B 40/00* (2013.01)

(58) Field of Classification Search
CPC .. H05B 6/1209; H05B 6/1272; H05B 6/1254; H05B 2206/022; Y02B 40/126; Y02B 40/00
USPC ........................................................ 219/622
See application file for complete search history.

(56) References Cited

U.S. PATENT DOCUMENTS

| | | | | | |
|---|---|---|---|---|---|
| 2,352,332 | A | * | 6/1944 | Limpel | H05B 6/365 219/644 |
| 3,108,169 | A | * | 10/1963 | Keller | C30B 13/30 219/638 |
| 3,485,986 | A | * | 12/1969 | Ross | H05B 6/08 219/646 |
| 3,635,411 | A | * | 1/1972 | Petrinjak | B65H 54/54 242/448 |
| 3,703,601 | A | * | 11/1972 | Babel | H05B 6/24 373/163 |
| 3,740,513 | A | * | 6/1973 | Peters, Jr. | A47B 77/08 219/622 |
| 3,781,506 | A | * | 12/1973 | Ketchum | H05B 6/062 219/627 |
| 3,790,735 | A | * | 2/1974 | Peters, Jr. | H05B 6/129 219/622 |
| 3,814,888 | A | * | 6/1974 | Bowers | A47J 36/2483 219/624 |
| 3,843,857 | A | * | 10/1974 | Cunningham | H05B 6/062 219/622 |
| 3,928,744 | A | * | 12/1975 | Hibino | H05B 6/062 219/624 |
| 3,996,442 | A | * | 12/1976 | Moreland, II | H05B 6/1245 219/624 |

(Continued)

FOREIGN PATENT DOCUMENTS

| | | |
|---|---|---|
| DE | 102015202032 | 8/2016 |
| EP | 2770801 | 8/2014 |
| EP | 3094159 | 11/2016 |

*Primary Examiner* — Eric S Stapleton
(74) *Attorney, Agent, or Firm* — Price Heneveld LLP

(57) ABSTRACT

An induction burner element for a cooking appliance includes a plurality of injection molded frames positioned in a spaced and concentric relationship, each injection molded frame having an upper cavity an at least one lower cavity. A ferrous member is disposed within the at least one lower cavity for each injection molded frame. A plurality of wound coils are disposed within the upper cavity for each injection molded frame, wherein each wound coil corresponds to a respective injection molded frame.

19 Claims, 8 Drawing Sheets

(56) References Cited

U.S. PATENT DOCUMENTS

| | | | | |
|---|---|---|---|---|
| 4,029,926 A * | 6/1977 | Austin | H01F 5/00 | 219/624 |
| 4,065,802 A * | 12/1977 | Mizukawa | H02H 7/127 | 361/18 |
| 4,189,633 A * | 2/1980 | Skinner | F24C 15/102 | 219/407 |
| 4,348,571 A * | 9/1982 | Dills | H05B 6/1254 | 219/622 |
| 4,351,996 A * | 9/1982 | Kondo | H05B 6/062 | 219/448.13 |
| 4,415,788 A * | 11/1983 | Field | H05B 6/1263 | 219/452.12 |
| 4,467,162 A * | 8/1984 | Kondo | H05B 6/1209 | 219/622 |
| 4,595,814 A * | 6/1986 | Ogino | H05B 6/062 | 219/624 |
| 4,629,843 A * | 12/1986 | Kato | H05B 6/1245 | 174/396 |
| 4,749,836 A * | 6/1988 | Matsuo | H05B 6/1272 | 219/626 |
| 4,770,355 A * | 9/1988 | Mori | H05B 6/1281 | 242/445.1 |
| 4,871,902 A * | 10/1989 | Kicherer | H05B 3/68 | 219/458.1 |
| 4,899,027 A * | 2/1990 | Wong | A47B 31/02 | 219/218 |
| 4,910,372 A * | 3/1990 | Vukich | H05B 6/1209 | 219/218 |
| 4,961,798 A * | 10/1990 | Hart | B29C 63/0069 | 156/86 |
| 5,050,490 A * | 9/1991 | Yahav | A47J 27/14 | 99/348 |
| 5,055,647 A * | 10/1991 | Heyes | H05B 6/104 | 219/645 |
| 5,070,222 A * | 12/1991 | Yahav | A47J 27/004 | 219/621 |
| 5,129,314 A * | 7/1992 | Hu | A47J 27/004 | 219/432 |
| 5,134,265 A * | 7/1992 | Dickens | H05B 6/1254 | 219/621 |
| 5,227,597 A * | 7/1993 | Dickens | A47J 37/0676 | 219/621 |
| 5,313,037 A * | 5/1994 | Hansen | B29C 65/3668 | 219/632 |
| 5,347,610 A * | 9/1994 | Lee | D06F 39/045 | 134/105 |
| 5,369,249 A * | 11/1994 | Kwon | H05B 6/1245 | 219/624 |
| 5,376,774 A * | 12/1994 | McGaffigan | H05B 6/065 | 219/624 |
| 5,412,171 A * | 5/1995 | Yahav | A47J 27/14 | 219/621 |
| 5,428,207 A * | 6/1995 | Essig | H05B 6/1254 | 219/622 |
| 5,430,273 A * | 7/1995 | Bogdanski | H05B 6/062 | 219/624 |
| 5,448,038 A * | 9/1995 | Kim | H05B 1/0266 | 219/627 |
| 5,488,214 A * | 1/1996 | Fettig | H05B 6/062 | 219/127 |
| 5,598,729 A * | 2/1997 | Hoffmann | B21D 22/18 | 72/10.4 |
| 5,603,858 A * | 2/1997 | Wyatt | A47J 39/006 | 126/246 |
| 5,686,006 A * | 11/1997 | Gaspard | H05B 6/1254 | 219/622 |
| 5,770,534 A * | 6/1998 | Hong | C09D 5/32 | 501/1 |
| 5,808,280 A * | 9/1998 | Gaspard | H05B 6/065 | 219/624 |
| 5,821,507 A * | 10/1998 | Sasaki | H05B 6/1227 | 219/622 |
| 5,844,212 A * | 12/1998 | Dickens | B29C 66/1142 | 219/621 |
| 5,866,884 A * | 2/1999 | Cornec | H05B 6/1263 | 219/622 |
| 5,934,181 A * | 8/1999 | Adamczewski | A47J 45/068 | 99/342 |
| 5,954,984 A * | 9/1999 | Ablah | H05B 6/12 | 219/621 |
| 5,979,429 A * | 11/1999 | Schultheis | F24C 3/067 | 126/39 E |
| 6,038,760 A * | 3/2000 | Antoine | H01F 41/04 | 219/676 |
| 6,144,019 A * | 11/2000 | Garcia | H05B 6/1281 | 219/624 |
| 6,181,559 B1 * | 1/2001 | Seo | H01L 23/4093 | 165/80.3 |
| 6,285,015 B1 * | 9/2001 | Doizaki | C21D 9/60 | 219/635 |
| 6,316,753 B2 * | 11/2001 | Clothier | H05B 6/06 | 219/621 |
| 6,369,370 B1 * | 4/2002 | Eskildsen | H05B 6/1254 | 219/621 |
| 6,375,350 B1 * | 4/2002 | Stein | F24C 7/083 | 250/353 |
| 6,528,770 B1 * | 3/2003 | Akel | H05B 6/04 | 219/624 |
| 6,841,764 B2 * | 1/2005 | Fuchs | A47J 36/06 | 219/621 |
| 6,956,188 B2 * | 10/2005 | de Rooij | H05B 6/1245 | 219/619 |
| 7,009,159 B2 * | 3/2006 | Kataoka | H05B 6/062 | 219/622 |
| 7,049,563 B2 * | 5/2006 | Keishima | H05B 6/1209 | 219/620 |
| 7,176,423 B2 * | 2/2007 | Kataoka | H05B 6/1209 | 219/620 |
| 7,205,512 B2 * | 4/2007 | Takagi | G03G 15/2053 | 219/619 |
| 7,323,668 B2 * | 1/2008 | Benitsch | H05B 6/101 | 219/647 |
| 7,390,994 B2 * | 6/2008 | Oh | H05B 6/1263 | 219/443.1 |
| 7,395,173 B2 * | 7/2008 | Kautz | G01K 7/42 | 702/130 |
| 7,750,273 B2 * | 7/2010 | Herving | H05B 6/12 | 219/622 |
| 7,755,009 B2 * | 7/2010 | Lasko | H05B 6/105 | 219/634 |
| 8,058,589 B2 * | 11/2011 | Cho | H05B 6/1245 | 219/448.11 |
| 8,078,072 B2 * | 12/2011 | Nanjo | G03G 15/2007 | 219/216 |
| 8,129,664 B2 * | 3/2012 | Keishima | H05B 6/1209 | 219/620 |
| 8,203,106 B2 * | 6/2012 | Kataoka | H05B 6/062 | 219/620 |
| 8,222,987 B2 * | 7/2012 | Gerhard | H01F 17/062 | 336/200 |
| 8,337,081 B1 * | 12/2012 | Holmberg | G01J 5/041 | 374/121 |
| 8,350,194 B2 * | 1/2013 | Lee | H05B 6/1272 | 219/460.1 |
| 8,602,248 B2 * | 12/2013 | Mathieu | A47J 27/002 | 219/620 |
| 8,704,141 B2 * | 4/2014 | Gutierrez | H05B 6/062 | 219/627 |
| 8,878,108 B2 * | 11/2014 | Kitaizumi | H05B 6/1245 | 126/220 |
| 8,890,041 B2 * | 11/2014 | Neumayer | H05B 6/1236 | 219/201 |
| 9,144,116 B2 * | 9/2015 | Stoffler | H05B 6/362 | |
| 9,226,343 B2 * | 12/2015 | Moon | H05B 6/062 | |
| 9,249,987 B2 * | 2/2016 | Foster | F24H 9/2007 | |
| 9,295,110 B2 * | 3/2016 | Matsui | H05B 6/1272 | |
| 9,370,051 B2 * | 6/2016 | Fossati | H05B 6/1254 | |
| 9,491,809 B2 * | 11/2016 | Shaffer | H05B 6/1254 | |

(56) References Cited

U.S. PATENT DOCUMENTS

| | | | | |
|---|---|---|---|---|
| 9,510,398 B1* | 11/2016 | Miller | | H05B 6/1209 |
| 9,648,667 B2* | 5/2017 | Moon | | H05B 6/062 |
| 9,725,200 B2* | 8/2017 | Kramer | | B65C 9/22 |
| 9,730,278 B2* | 8/2017 | Suzuki | | H05B 6/1209 |
| 9,736,891 B2* | 8/2017 | Fujita | | A47J 36/02 |
| 9,796,056 B2* | 10/2017 | Snyder | | B23P 11/00 |
| 9,807,822 B2* | 10/2017 | Alonso Esteban | | C03C 17/36 |
| 9,812,881 B2* | 11/2017 | Zahn | | H01F 17/04 |
| 9,833,101 B2* | 12/2017 | Moon | | A47J 27/002 |
| 9,848,729 B2* | 12/2017 | Reischmann | | A47J 27/00 |
| 9,859,051 B2* | 1/2018 | Ren | | H01F 38/14 |
| 9,913,320 B2* | 3/2018 | Garvey | | G01P 15/02 |
| 10,064,246 B2* | 8/2018 | Reischmann | | H05B 6/1209 |
| 2003/0232515 A1* | 12/2003 | Shepherd | | H01R 13/7031 |
| | | | | 439/18 |
| 2004/0217098 A1* | 11/2004 | Polikarpus | | G01N 27/4062 |
| | | | | 219/209 |
| 2004/0245244 A1* | 12/2004 | Hirota | | H05B 6/1254 |
| | | | | 219/624 |
| 2005/0115957 A1* | 6/2005 | Kataoka | | H05B 6/062 |
| | | | | 219/620 |
| 2006/0000793 A1* | 1/2006 | Mavin | | B65D 47/103 |
| | | | | 215/253 |
| 2006/0191912 A1* | 8/2006 | Roth | | H05B 6/1281 |
| | | | | 219/675 |
| 2007/0278215 A1* | 12/2007 | Schilling | | H05B 6/1263 |
| | | | | 219/622 |
| 2008/0185376 A1* | 8/2008 | Gagas | | H05B 6/1263 |
| | | | | 219/623 |
| 2008/0223852 A1* | 9/2008 | Bassill | | H05B 6/062 |
| | | | | 219/647 |
| 2008/0295701 A1* | 12/2008 | Richter | | H05B 6/1254 |
| | | | | 99/323.5 |
| 2009/0084777 A1* | 4/2009 | Oh | | H05B 6/1254 |
| | | | | 219/672 |
| 2009/0195110 A1* | 8/2009 | Miyake | | H02K 1/08 |
| | | | | 310/216.058 |
| 2009/0314771 A1* | 12/2009 | Okada | | H05B 6/062 |
| | | | | 219/647 |
| 2010/0065551 A1* | 3/2010 | Tominaga | | H05B 6/062 |
| | | | | 219/622 |
| 2010/0181300 A1* | 7/2010 | Gutierrez | | H05B 6/062 |
| | | | | 219/620 |
| 2010/0270288 A1* | 10/2010 | Hackbarth | | H05B 6/1236 |
| | | | | 219/624 |
| 2010/0282737 A1* | 11/2010 | Acero Acero | | H05B 6/1254 |
| | | | | 219/600 |
| 2011/0003048 A1* | 1/2011 | Sugimoto | | A47J 27/004 |
| | | | | 426/509 |
| 2011/0073588 A1* | 3/2011 | Kusaka | | H05B 6/062 |
| | | | | 219/621 |
| 2011/0100980 A1* | 5/2011 | Kitaizumi | | H05B 6/1245 |
| | | | | 219/624 |
| 2012/0132646 A1* | 5/2012 | England | | H05B 6/062 |
| | | | | 219/622 |
| 2013/0119049 A1* | 5/2013 | Graber | | H05B 6/1209 |
| | | | | 219/621 |
| 2013/0199027 A1* | 8/2013 | Singh | | A61N 1/3787 |
| | | | | 29/602.1 |
| 2013/0199028 A1* | 8/2013 | Singh | | A61N 1/0553 |
| | | | | 29/602.1 |
| 2013/0341320 A1* | 12/2013 | Tailor | | F16L 13/0272 |
| | | | | 219/643 |
| 2015/0245421 A1* | 8/2015 | Heczko | | A47J 36/2483 |
| | | | | 99/323.3 |
| 2016/0126816 A1* | 5/2016 | Kimura | | H02K 15/125 |
| | | | | 427/58 |
| 2016/0254734 A1* | 9/2016 | Kimura | | H02K 15/12 |
| | | | | 29/596 |

\* cited by examiner

US 11,665,790 B2

INDUCTION BURNER ELEMENT HAVING A PLURALITY OF SINGLE PIECE FRAMES

BACKGROUND

The device is in the field of induction cooktop appliances, and more specifically, an induction burner for a cooktop appliance having a series of single piece induction coils that incorporate both a ferrous material and a wound coil within the single frame.

SUMMARY

In at least one aspect, an induction burner element for a cooking appliance includes a plurality of injection molded frames positioned in a spaced and concentric relationship, each injection molded frame having an upper cavity an at least one lower cavity. A ferrous member is disposed within the at least one lower cavity for each injection molded frame. A plurality of wound coils are disposed within the upper cavity for each injection molded frame, wherein each wound coil corresponds to a respective injection molded frame.

In at least another aspect, an induction cooking appliance includes an induction burner defining a plurality of heating zones and a plurality of induction frames. Each induction frame corresponds to a respective heating zone of the plurality of heating zones. Each induction frame includes a coil channel within a top portion of the induction frame and at least one recess defined within a bottom portion of the induction frame. The coil channel and recess are separated by a medial divider. A ferrous member is disposed in each recess. A wound coil is disposed in each coil channel, wherein the wound coil and ferrous member are in electromagnetic communication with one another.

In at least another aspect, a method of forming an induction burner includes positioning a plurality of ferrous members into a plurality of induction coil forms, each induction coil form corresponding to a heating zone of the burner element. The method also includes injecting a formable plastic material into each coil form of the plurality of coil forms. The method also includes disposing the formable plastic material around the plurality of ferrous members to form a plurality of induction frames, each induction frame corresponding to a heating zone. The method also includes curing the formable plastic material around the plurality of ferrous members to secure each ferrous member within a bottom portion of a corresponding induction frame, wherein each induction frame also includes a coil channel defined within a top portion of the corresponding induction frame. The method also includes disposing a wound coil within each coil channel, wherein each wound coil is in electromagnetic communication with each ferrous member in the corresponding heating zone to define a respective heating coil. The method also includes coupling at least one bridge member to the respective heating coils, wherein the heating coils define a substantially concentric configuration of the burner element.

These and other features, advantages, and objects of the present device will be further understood and appreciated by those skilled in the art upon studying the following specification, claims, and appended drawings.

DETAILED DESCRIPTION OF EMBODIMENTS

Figure 1:
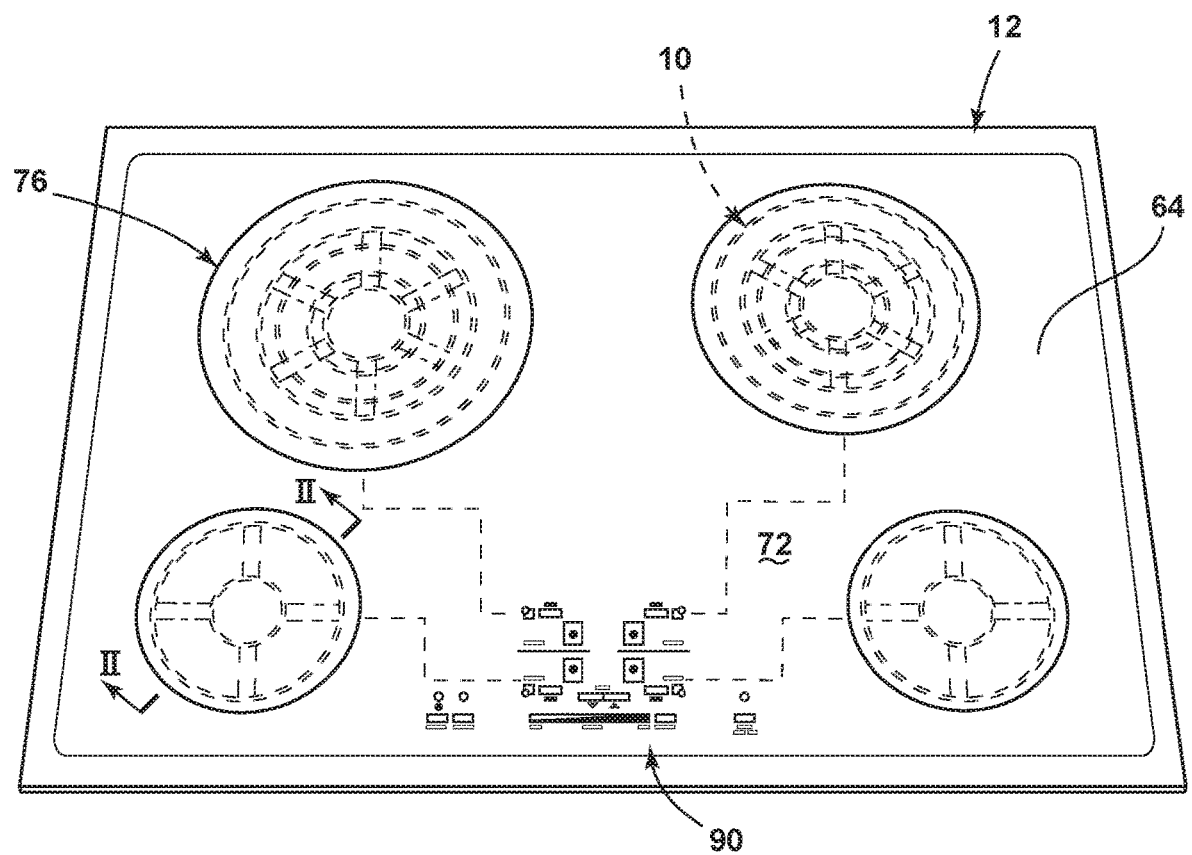
FIG. 1 is a top perspective view of an induction cooktop incorporating an aspect of the single piece frames for an induction burner.
Figure 2:
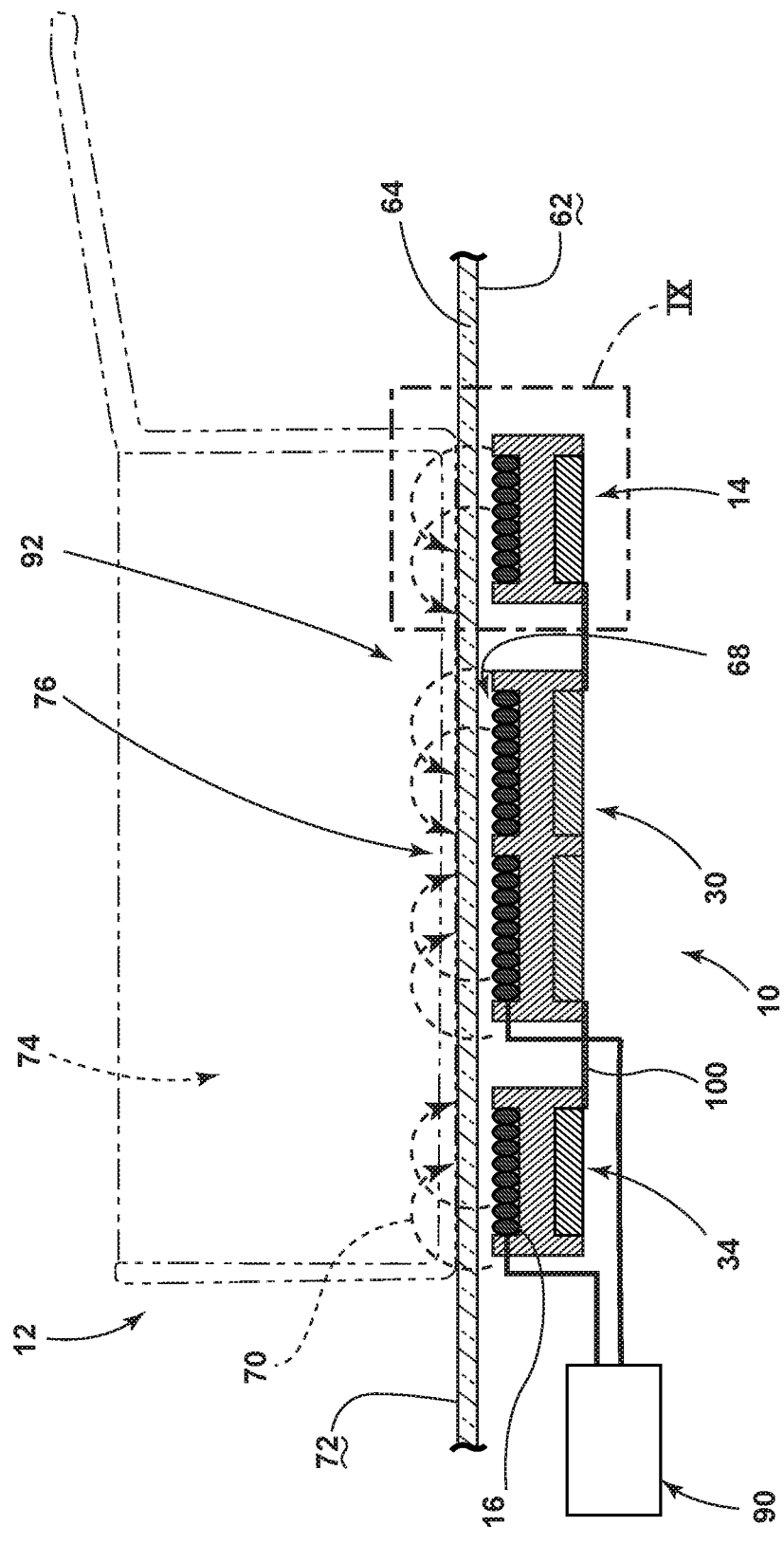
FIG. 2 is a cross-sectional view of the induction cooktop of FIG. 1, taken along line II-II.
Figure 3:
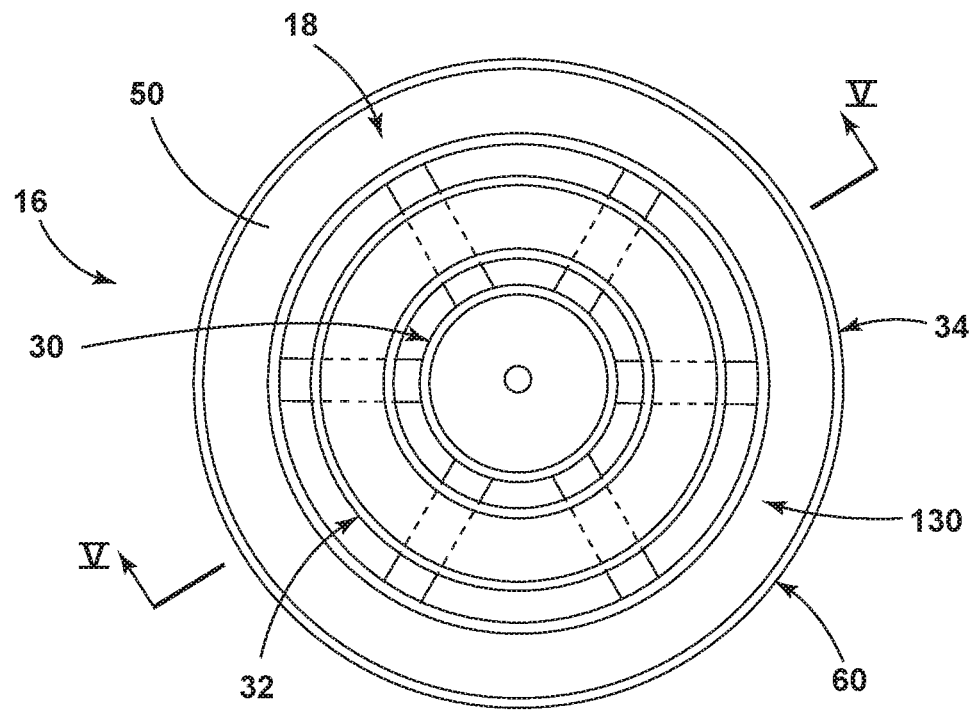
FIG. 3 is a top plan view of an induction burner incorporating an aspect of the single piece frames.
Figure 4:
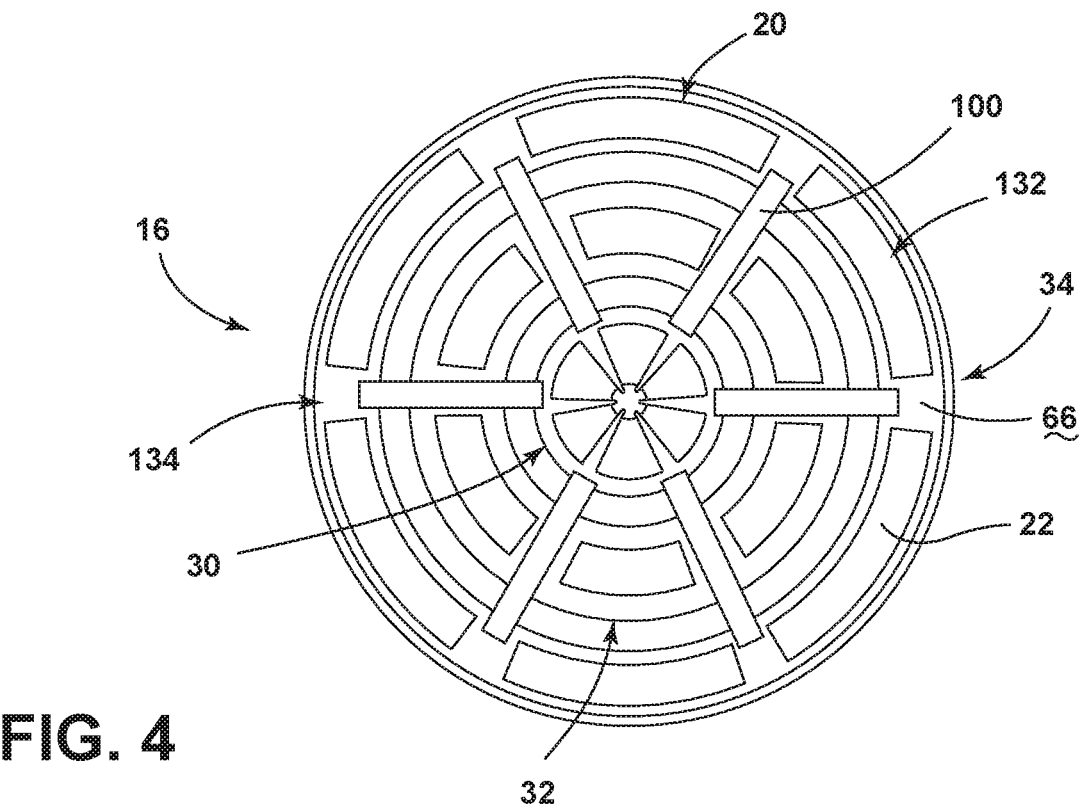
FIG. 4 is a bottom plan view of the induction burner element of FIG. 3.
Figure 5:
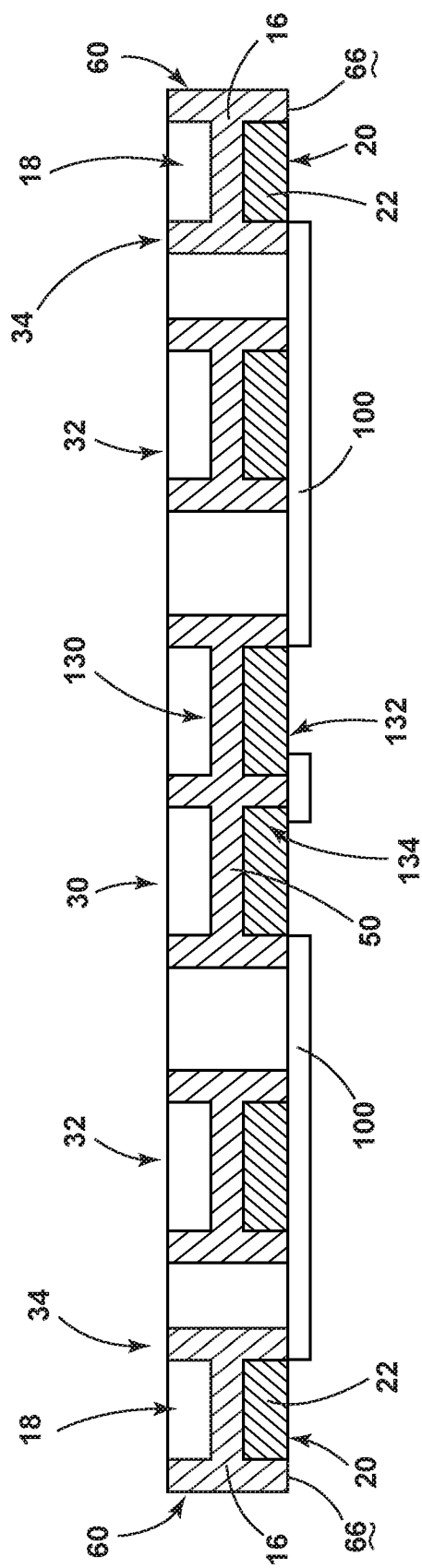
FIG. 5 is a cross-sectional view of the induction burner element of FIG. 3 taken along line V-V.
Figure 6:
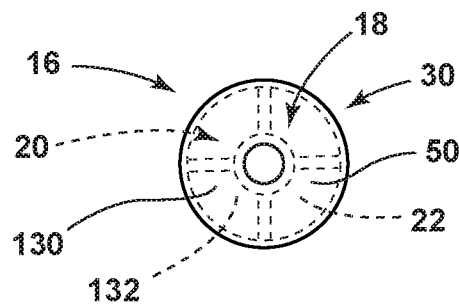
FIG. 6 is a top plan view of an inner circular frame of the single piece frames for the induction burner.
Figure 7:
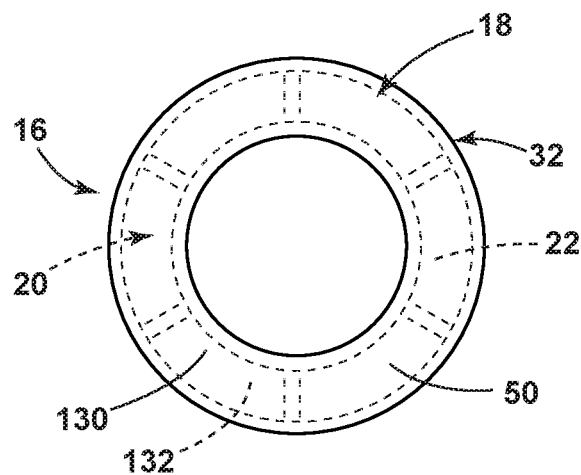
FIG. 7 is a top plan view of a medial ring frame of the various single piece frames of an induction burner element.
Figure 8:
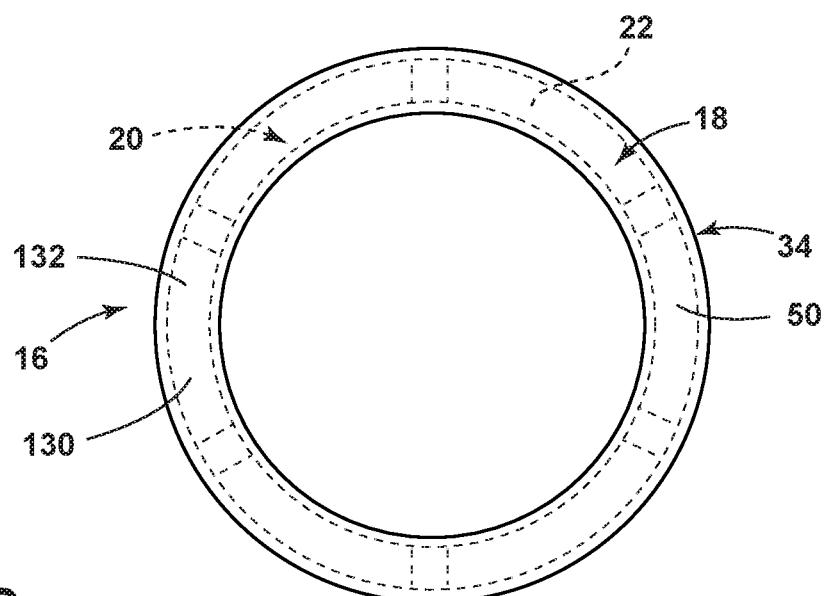
FIG. 8 is a top plan view of an aspect of an outer ring frame of the plurality of single piece frames for an induction burner element.
Figure 9:
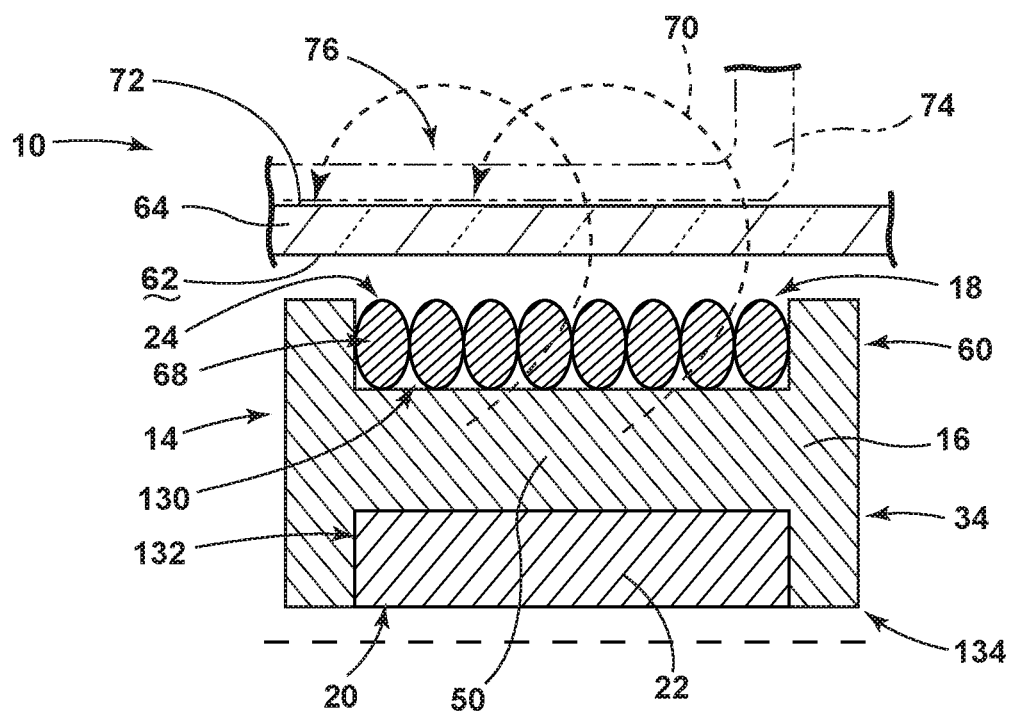
FIG. 9 is an enlarged cross-sectional view of the induction burner element of FIG. 2 taken at area IX.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-9, reference numeral 10 generally refers to an induction burner that can be disposed within a cooking appliance 12, typically a cooktop induction-heating appliance 12. According to the various embodiments, the induction burner 10 can include one or more individual induction coils 14 that are connected together to define a plurality of induction coils 14 for a single induction burner 10 for the cooking appliance 12. Each induction coil 14 that is used within the induction burner 10 for the cooking appliance 12 can include a plurality of injection molded frames 16 that are positioned in a spaced and, typically, a concentric relationship. Each of the injection molded frames 16 includes an upper cavity 18 and at least one lower cavity 20. A plurality of ferrous members 22 are disposed within the at least one lower cavity 20 for each of the injection molded frames 16. Typically, the ferrous members 22 are insert injection-molded within the injection molded frame 16 such that the ferrous members 22 are set within a position within the form and the injection molded material is disposed around the various ferrous members 22 for each of the injection molded frames 16. A plurality of wound turns in the form of coils 24 are disposed within the upper cavity 18 for each of the injection molded frames 16. It is contemplated that each wound turn or coil 24 corresponds to a respective injection molded frame 16. The various wound coils 24 are disposed in electromagnetic communication with a set of ferrous members 22 for each of the injection molded frames 16.

According to the various embodiments, the various injection molded frames 16 can include an inner circular frame 30, a medial ring frame 32, and an outer ring frame 34 that are coupled together as separate induction coils 14 to define the induction burner 10. Each of the inner circular frame 30, medial ring frame 32 and outer ring frame 34 includes one or more ferrous members 22 disposed within a lower cavity 20 of each of these frames 16. Each of these frames 16 also includes a corresponding wound coil 24 that is in electromagnetic communication with corresponding ferrous members 22 disposed within each lower cavity 20 of the respective injection molded frames 16 of the induction burner 10.

Referring again to FIGS. 1-9, the upper cavity 18 of each of the injection molded frames 16 and the at least one lower cavity 20 of each of the injection molded frames 16 are separated by an integral medial divider 50. This integral medial divider 50 is integral with the injection molded frames 16 such that each injection molded frame 16 is an integral and unitary member that is injection molded, typically, with a single-shot injection molding process. Accordingly, each ferrous member 22 or set of ferrous members 22 and the wound coils 24 for each of the inner circular frame 30, medial ring frame 32 and outer ring frame 34 are set within a single injection molded frame 16 that defines a single piece.

According to the various embodiments, the injection molded induction frames 16 can be created through various forming techniques. Such forming techniques can include, but are not limited to, injection molding, insert injection molding, compression molding, blow molding, combinations thereof and other similar molding techniques. Typically, the formable material used to create the induction frames 16 is a formable plastic. Such a material does not tend to interfere with the electromagnetic properties of the various wound coils 24 of the induction coils 14 for the induction burner 10. Other materials may be used for the induction frames 16 that do not tend to interfere with the electromagnetic communication of the induction burner 10. Such materials can include composite materials, certain non-ferromagnetic metals, polymers, combinations thereof and other similar materials.

Referring again to FIGS. 1 and 2, within the cooking appliance 12, respective upper cavities 18 of each of the injection molded frames 16 are defined within a top portion 60 of that particular injection molded frame 16. In this manner, each wound coil 24, when set within a respective upper cavity 18, is positioned near the underside 62 of the cooktop plate 64 for the cooking appliance 12. In this configuration, each lower cavity 20 of the injection molded frames 16 is accessible through a bottom surface 66 of each of the injection molded frames 16 such that the ferrous members 22 disposed within the lower cavities 20 are positioned below the wound coils 24 disposed within the upper cavities 18. Through this configuration, the ferrous members 22 are configured to direct the electromagnetic field 70 generated by electrical current 68 passing through the various wound or turned coils 24. The ferrous members 22 direct this electromagnetic field 70 toward the cooktop surface 72 such that the electromagnetic field 70 can interact with an appropriate cooking utensil 74 that is set within a corresponding heating zone 76 above the induction burner 10.

Referring again to FIGS. 1-9, the induction burner 10 can include a controller 90 that is independently and separably connected to each wound coil 24 disposed within the upper cavities 18 of the inner circular frame 30, medial ring frame 32 and outer ring frame 34, respectively. The controllers 90 are adapted to selectively and independently regulate a flow of electrical current 68 to each wound coil 24. As discussed above, as the electrical current 68 passes through the various wound coils 24, an electromagnetic field 70 is generated around the charged wound coils 24. As discussed above, the various ferrous members 22 serve to direct the electromagnetic field 70 to be positioned above the cooktop surface 72 of the cooktop plate 64 so that the electromagnetic field 70 can engage and interact with a set of utensils 74 within a heating zone 76 positioned above the induction burner 10. It is contemplated that each of the inner circular frame 30, medial ring frame 32 and outer ring frame 34 can be independently activated by the controller 90 to control the positioning of the electromagnetic field 70 above the induction burner 10. It is also contemplated that combinations of these frames 16 can be charged to alter the size and configuration of the electromagnetic field 70 defined within the heating zone 76. When the combinations of wound coils 24 are activated, this can be defined as a joined condition 92 defined by the controller 90 operating at least two different wound coils 24 simultaneously.

Referring again to FIGS. 1-9, it is contemplated that the plurality of injection molded frames 16 are coupled together by one or more bridge members 100 that extend between at least two adjacent injection molded frames 16. It is contemplated that the bridge members 100 can be injection molded members that are injection molded along with each of the injection molded frames 16 such that the inner circular frame 30, medial ring frame 32 and outer ring frame 34 are injection molded along with the various bridge members 100 within a single mold to form a unitary component. It is also contemplated that the bridge members 100 can be injection molded after formation of each of the inner circular frame 30, medial ring frame 32 and outer ring frame 34. In such an embodiment, the various bridge members 100 can be injection molded through a second injection molded process to couple together the various injection molded frames 16 of the induction burner 10.

Figure 10:
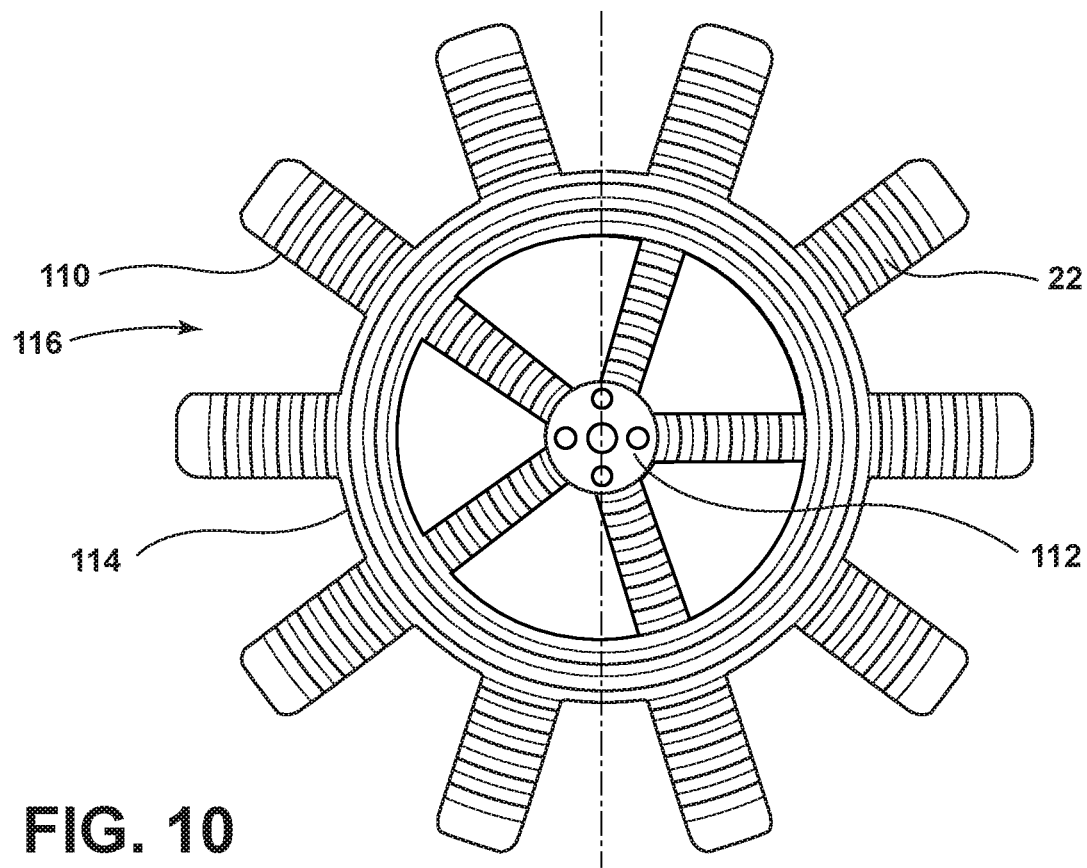
FIG. 10 is a top plan view of an aspect of a bridge element for holding together the single piece frames of the induction burner element.

Referring now to FIG. 10, it is contemplated that a unitary member 116 can also act as a portion of the bridge member 100 for the induction burner 10. In such an embodiment, the bridge member 100 can include a plurality of members that extend radially outward, such as in the form of spokes 110 that extend from a center hub 112 of the induction burner 10 and where the spokes 110 radiate outward. One or more intermediate rings 114 can connect the spokes 110. The intermediate rings 114 can correspond to one or more of the injection molded frames 16. The various injection molded frames 16 can be injection molded around the various spokes 110, center hub 112 and intermediate rings 114 of the unitary member 116. In this manner, as the injection molded frames 16 are formed, the injection molding material forms around the unitary member 116 to define the frames 16 and bridge members 100 and also, simultaneously, can set the positions of the various ferrous members 22 within the induction burner 10 with respect to the various injection molded frames 16. According to various embodiments, the unitary member 116 and/or the various bridge members 100 can at least partially be defined by one or more ferrous members 22. It is also contemplated that the unitary member 116 can include a unitary ferrous member.

Referring again to FIGS. 1-9, it is contemplated that each injection molded frame 16 can be formed independently. After being formed, the one or more ferrous members 22 are insert injection molded within each of the injection molded frames 16. The wound coil 24 can then be disposed within the upper cavity 18 of the corresponding injection molded frame 16. Once the injection molded frame 16 is formed with the ferrous member 22 disposed therein and the wound coil 24 installed within the upper cavity 18, this assembly can define the induction coil 14 or induction coil 14. Each of the induction coils 14 can then be set in configuration with other induction coils 14 to define various configurations of induction burners 10. Accordingly, an induction burner 10 can include a two-part configuration of inner and outer induction coils 14, a three-part configuration of an inner, medial and outer induction coils 14, and various combinations of induction coils 14 combined together to form any one of various configurations of induction burners 10 that can be coupled to the controller 90 and operated according to various heating sequences.

Referring again to FIGS. 1-11, an induction cooking appliance 12 can include the induction burner 10 that defines a plurality of heating zones 76. The induction burner 10 can include one or more injection molded induction frames 16, where each induction frame 16 corresponds to an injection molded frame 16 for the induction burner 10. Each induction frame 16 corresponds to a respective heating zone 76 of the plurality of heating zones 76 for the induction burner 10.

As exemplified in FIGS. 1-11, each induction frame 16 includes a coil channel 130 within a top portion 60 of the induction frame 16 and at least one recess defined within a bottom portion 134 of the induction frame 16. The coil channel 130 and recess 132 are separated by the medial divider 50 that extends through each induction frame 16. Accordingly, it is contemplated that the coil channel 130 and one or more recesses 132 are entirely separated from one another through the medial divider 50, or are substantially separated from one another through the medial divider 50. A ferrous member 22 is disposed within each recess 132. According to various embodiments, the recess 132 can include a single continuous recess 132 such that a single ferrous member 22 is disposed within that recess 132, or a plurality of recesses 132 can receive a corresponding plurality of ferrous members 22. A wound coil 24 is disposed within each coil channel 130, wherein the wound coil 24 and ferrous member 22 are in electromagnetic communication with one another. Through the medial divider 50, the wound coil 24 and ferrous member 22 are separated from one another such that they are free of direct contact with one another, but remain in electromagnetic communication.

Referring again to FIGS. 1-10, the various induction frames 16 can include the inner circular frame 30, medial ring frame 32 and outer ring frame 34, as well as additional frame elements, that are coupled together either through a mechanical attachment, injection molded together, connected through a unitary ferrous member 116, or other similar connecting mechanisms. It is also contemplated that the various induction frames 16 can be attached through an adhesive, welding, combinations thereof, combinations of these in conjunction with a mechanical fastening method, and other similar attachment methods. It is also contemplated that the various induction frames 16 can include the three induction frames 16 mentioned above as well as additional induction frames 16 that can be combined together to form various burner configurations for the induction burner 10.

Referring again to FIGS. 1-10, each of the inner circular frame 30, the medial ring frame 32 and the outer ring frame 34 each correspond to a respective heating zone 76 for the induction burner 10. As discussed above, a controller 90 is connected to the wound coils 24 within each of these frames 16, such that the controller 90 can independently and selectively control each of the wound coils 24 in each of these frames. Additionally, combinations of two or more of the inner circular frame 30, medial ring frame 32 and outer ring frame 34 can correspond to a joined condition 92 that corresponds to a combination heating zone 76 of the plurality of heating zones 76. In this combination heating zone 76, two or more of the wound coils 24 for the various induction frames 16 can be charged simultaneously to alter the size and configuration of the electromagnetic field 70 generated by the induction burner 10.

Referring again to FIGS. 1-10, through the use of the injection molded frames 16, a single structural member in the form of the induction frames 16 can support both the ferrous member 22 and the wound coil 24 within a single injection molded assembly. Accordingly, multiple individual formed members that may house a ferrous material and a wound coil 24 separately, can be eliminated and fewer steps may be necessary to form each induction coil 14 made up of the induction frame 16, wound coil 24 and ferrous member 22. Once each induction coil 14 is formed, the various induction coils 14 can be positioned relative to one another and attached to one another through the various bridge members 100 that extend between the induction coils 14. As discussed above, any one of the various connection methods can be used to join the various induction coils 14 together to form the induction burner 10.

Figure 11:
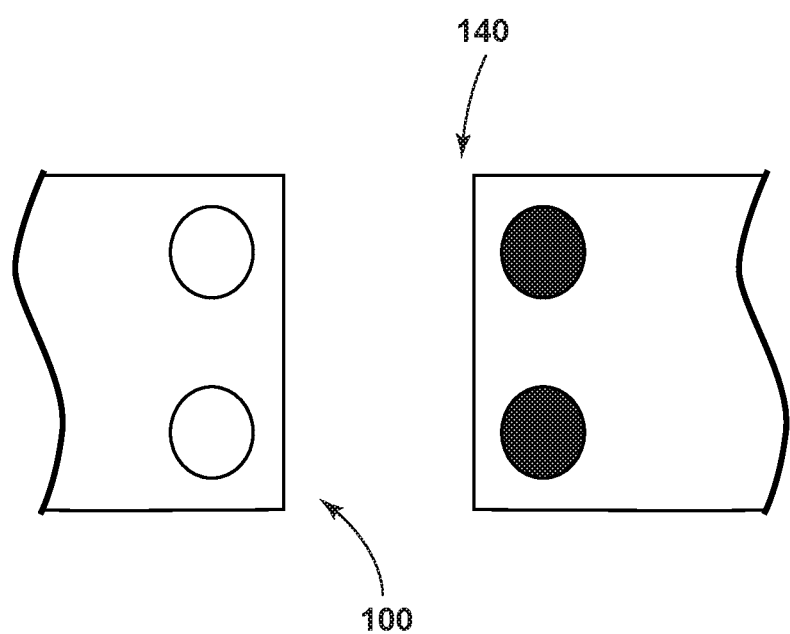
FIG. 11 is a schematic view of another aspect of the bridge element for holding together the plurality of single piece frames of the induction burner element.
Figure 12:
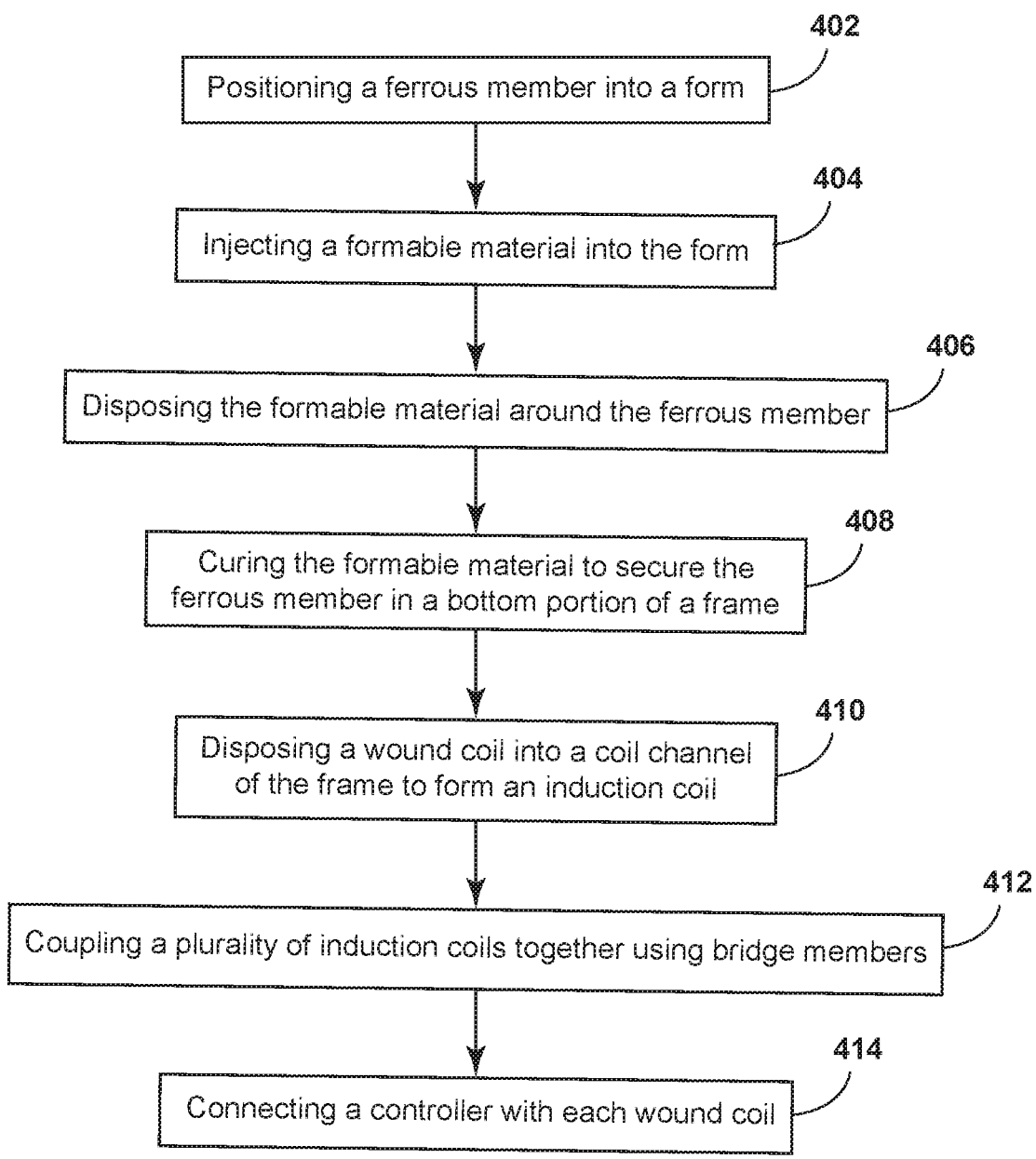
FIG. 12 is a schematic flow chart illustrating a method of forming an induction burner element using a plurality of single piece frames.

Referring now to FIG. 11, it is contemplated that the bridge members 100 can include separate injection molded members that can be attached to adjacent induction frames 16. In at least one embodiment, the bridge members 100 can be separate plastic members that can be attached through a male-female connector 140 with each of the induction frames 16. It is contemplated that the bridge members 100 can be separate injection molded members, or can be injection molded members that are integral to at least one of the induction frames 16. The use of the male-female connectors 140 of the bridge members 100 can allow for a single induction frame 16 to be coupled with various configurations of other induction frames 16, where each induction frame 16 is compatible with the male-female connector 140 of the various bridge members 100.

Referring now to FIGS. 1-12, having described various embodiments of the induction burner 10 having the induction frames 16, a method 400 is disclosed for forming an induction burner 10. According to the method 400, one or more ferrous members 22 can be positioned into one or more induction coil 14 forms for creating the induction frames 16 (step 402). According to various embodiments, a single ferrous member 22 can be set within a single induction coil form. Alternatively, a plurality of ferrous members 22 can be set within a plurality of induction coil forms. It is contemplated that each induction coil form can correspond to a separate heating zone 76 of the induction coil.

Once the position of the one or more ferrous members 22 is set, a formable plastic material is injected into each form of the one or more forms (step 404). The formable plastic material is then disposed around the one or more ferrous members 22 to form a plurality of induction frames 16 (step 406). As discussed above, each induction frame 16 can correspond to a particular heating zone 76. The formable plastic material is then cured around the one or more ferrous members 22 to secure each ferrous member 22 within a bottom portion 134 of the corresponding induction frame (step 408). Each induction frame 16 also includes a coil channel 130 defined within a top portion 60 of the corresponding induction frame 16. A wound coil 24 is then disposed within each coil channel 130 (step 410). Each wound coil 24 is in electromagnetic communication with each corresponding ferrous member 22 within the corresponding heating zone 76 to define a respective heating coil or induction coil. At least one bridge member 100 can be used to couple the respective heating coil or induction coils together (step 412). The induction coils define a substantially concentric configuration of the induction burner 10. A controller 90 can then be connected with each wound coil 24 of the heating or induction coils (step 414). The controller 90 is adapted to selectively and independently regulate a flow of electrical current 68 to each wound coil 24 for the induction burner 10. As discussed above, operation of the controller 90 can activate and/or deactivate the various wound coils 24 individually or in combination to define various sizes and configurations of the heating zone 76 for the induction burner 10.

According to the various embodiments, the ferrous material used in the ferrous member 22 of the induction burner 10 can include various materials that can include, but are not limited to, steel, iron, nickel, ferrous mica, alloys of the preceding, combinations of the preceding, and other similar ferrous-type materials.

According to the various embodiments, the induction burner 10 described herein can be used with any one of various appliances 12. Such appliances 12 can include, but are not limited to, induction cooktops, induction ranges, single-burner appliances, portable induction burners 10, and other similar induction appliances.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An induction burner element for a cooking appliance, the induction burner element comprising:
    a plurality of injection molded frames positioned in a spaced and concentric relationship, wherein the plurality of injection molded frames includes an inner frame and a plurality of outer concentric frames, each injection molded frame of the plurality of injection molded frames having an upper cavity and at least one lower cavity;
    ferrous members that extend concentrically about a center of the plurality of injection molded frames, wherein the ferrous members are contained within the at least one lower cavity for each injection molded frame, respectively, wherein each ferrous member is confined within a respective molded frame; and
    a plurality of wound coils disposed within the upper cavity for each injection molded frame, wherein each wound coil of the plurality of wound coils corresponds to a respective injection molded frame.

2. The induction burner element of claim 1, wherein the upper cavity and the at least one lower cavity of each of the injection molded frames are separated by an integral medial divider.

3. The induction burner element of claim 1, wherein the respective upper cavities are defined within a top portion of each of the injection molded frames.

4. The induction burner element of claim 1, wherein the at least one lower cavity is accessible through a bottom surface of each of the injection molded frames, and wherein the ferrous member is made of a magnetic metal.

5. The induction burner element of claim 1, wherein the plurality of injection molded frames includes the inner frame defined by an inner circular frame, and the plurality of outer concentric frames defined by a medial ring frame and an outer ring frame that are coupled together.

6. The induction burner element of claim 1, further comprising:
a controller that is independently and separately connected to each wound coil, wherein the controller is adapted to selectively and independently regulate a flow of electrical current to each wound coil.

7. The induction burner element of claim 6, wherein the wound coils are selectively operable to define a joined condition defined by the controller operating at least two of the wound coils simultaneously.

8. The induction burner element of claim 1, wherein the plurality of injection molded frames are coupled together by a plurality of bridge members that extend between at least two adjacent injection molded frames.

9. The induction burner element of claim 8, wherein the plurality of bridge members are injection molded members.

10. The induction burner element of claim 8, wherein the plurality of bridge members are at least partially defined by the ferrous member.

11. The induction burner element of claim 1, wherein the ferrous members are insert injection molded within the at least one lower cavity for each of the plurality of injection molded frames, respectively.

12. An induction cooking appliance comprising:
an induction burner defining a plurality of concentric heating zones;
a plurality of induction frames that are concentrically positioned to form the induction burner, the plurality of induction frames including an inner frame and a plurality of concentric outer frames positioned outside of the inner frame, each induction frame of the plurality of induction frames corresponding to a respective heating zone of the plurality of concentric heating zones, each induction frame including a coil channel within a top portion of the induction frame and at least one recess defined within a bottom portion of the induction frame, the coil channel and recess are separated by a medial divider;
ferrous members respectively confined within a respective recess of a respective induction frame of the plurality of induction frames; and
wound coils respectively disposed in each coil channel, wherein the wound coils and the ferrous members for each induction frame are in respective electromagnetic communication with one another to define the plurality of concentric heating zones.

13. The induction cooking appliance of claim 12, wherein the inner frame is defined by an inner circular frame, and the plurality of concentric outer frames are defined by a medial ring frame and an outer ring frame that are coupled together with the inner circular frame.

14. The induction cooking appliance of claim 13, wherein each of the inner circular frame, the medial ring frame and the outer ring frame correspond to a respective heating zone.

15. The induction cooking appliance of claim 14, wherein combinations of two or more of the inner circular frame, the medial ring frame and the outer ring frame correspond to combination heating zones of the plurality of concentric heating zones.

16. The induction cooking appliance of claim 12, wherein the plurality of induction frames are coupled together by a plurality of bridge members that extend between at least two adjacent induction frames of the plurality of induction frames.

17. The induction cooking appliance of claim 16, wherein the plurality of bridge members are injection molded members that are integral to at least one of the induction frames.

18. The induction cooking appliance of claim 16, wherein the plurality of bridge members are connected to the injection molded frames by an at least partially mechanical engagement.

19. The induction cooking appliance of claim 12, wherein the ferrous members are insert injection molded within each recess of the at least one recess for each induction frame, respectively, and wherein the ferrous members extend circumferentially about a center of the plurality of concentric heating zones.

* * * * *